United States Patent [19]

Bradfield

[11] Patent Number: 5,625,244
[45] Date of Patent: Apr. 29, 1997

[54] FAN AND SLIP RING ASSEMBLY

[75] Inventor: Michael D. Bradfield, Anderson, Ind.

[73] Assignee: General Motors Corporation, Detroit, Mich.

[21] Appl. No.: 533,574

[22] Filed: Sep. 25, 1995

[51] Int. Cl.$^6$ ............................................. H02K 13/02
[52] U.S. Cl. .................................. 310/232; 310/71
[58] Field of Search .......................... 310/263, 227, 310/232, 52, 58, 62, 63, 71

[56] References Cited

U.S. PATENT DOCUMENTS

| | | | |
|---|---|---|---|
| 4,119,873 | 10/1978 | Sakuri | 310/56 |
| 4,137,474 | 1/1979 | Krieger | 310/227 |
| 4,246,506 | 1/1981 | Vartanian et al. | 310/232 |
| 4,267,475 | 5/1981 | Vitchenko et al. | 310/232 |
| 4,410,821 | 10/1983 | Kurt | 310/227 |
| 4,588,911 | 5/1986 | Gold | 310/62 |
| 5,254,986 | 10/1993 | Bradfield et al. | 310/263 |

*Primary Examiner*—Thomas M. Dougherty
*Assistant Examiner*—Michael Wallace, Jr.
*Attorney, Agent, or Firm*—Vincent A. Cichosz

[57] ABSTRACT

A dynamoelectric machine having a rotor carrying a field coil has a fan and slip ring assembly formed from a thermoplastic material into a unitary structure. A slip ring portion is axially remote from the fan portion, the two portions being connected by thermoplastic material which is formed to cooperate with the rotor shaft to provide channels for capturing coil leads of the field coil.

3 Claims, 3 Drawing Sheets

FAN AND SLIP RING ASSEMBLY

BACKGROUND

The present invention is directed toward rotating electric machines having slip rings and an air circulation fan.

An alternator design popular among automotive manufacturers incorporates a pair of internal air circulating fans. One such design manufactured by General Motors Corporation through Delphi Automotive Systems is shown in cross section in FIG. 1 hereof. Alternator 10 has a rotor assembly generally designated by the reference numeral 20 and stator assembly generally designated by the reference numeral 15. The rotor assembly 20 includes a shaft 21 supporting all rotating magnetic circuit structures thereof including conventional pole-members 16A and 16B, rotor core 17 and field coil 18 wound upon bobbin 12. Additionally, all other non-magnetic circuit rotating structures are carried thereby, including air circulation fans 19 and 27 located at axially opposite sides of the pole-members, and a slip ring assembly 30 located at one extreme end of the shaft. Fan 27 is formed from sheet metal stock and spot welded to pole-member 16B while fan 19 is formed from an appropriate thermoplastic material and heat staked to tower extensions (not shown) from the field coil bobbin 12. The shaft 21 in turn is rotatably supported within a housing 26 by a pair of bearings 23 and 22. Bearing 23 is located between the slip ring assembly 30 and the fan 19.

Coil leads 18A of field coil 18 are wrapped about respective posts 12A of bobbin 12 and pass through holes 13 in fan 19. Slip ring assembly 30 is made of a pair of copper rings 31, each having a slip ring lead 32 joined such as by welding thereto. The copper rings and wires are molded into a thermoset material to complete the slip ring assembly. Slip ring assembly 30 is pressed onto the end of rotor shaft 21 and the slip ring leads 32 are routed into channels along the shaft 21 where they are joined such as by twisting and welding to the coil leads 18A of field coil 18. The joint 24 is then bent to the surface of the fan 19 and typically secured thereto such as by heatstaking. Bearing 23 is assembled to pass over the slip ring assembly 30 to retain the lead wires 32 securely within the shaft channels.

SUMMARY

Therefore, in accordance with the present invention, a fan and a pair of slip rings are integrated into a unitary assembly which cooperatively with the rotor shaft of the machine provides for simple routing and single point termination for rotor coil leads. A fan portion has a hub portion and a carrier portion extending radially therefrom. Axially remote from the hub portion is a slip ring assembly which is coupled to the hub portion by a connecting means. The connecting means and the rotor shaft cooperate to provide channels for the coil leads such that the coil leads pass through the hub aperture along the rotor shaft and exit at the end thereof. The slip ring assembly includes a pair of slip rings and corresponding terminal extending axially therefrom. A respective one of the coil leads is coupled to each slip ring terminal.

In accordance with a first preferred embodiment, the connecting means comprises a pair of legs forming respective longitudinal channels to contain respective ones of the coil leads between the respective leg and the rotor shaft.

In accordance with another preferred embodiment, the connecting means comprises a substantially tubular portion having a pair of channels formed longitudinally along the inner surface thereof, which channels cooperate with the rotor shaft to contain the coil leads.

DETAILED DESCRIPTION

Figure 1:
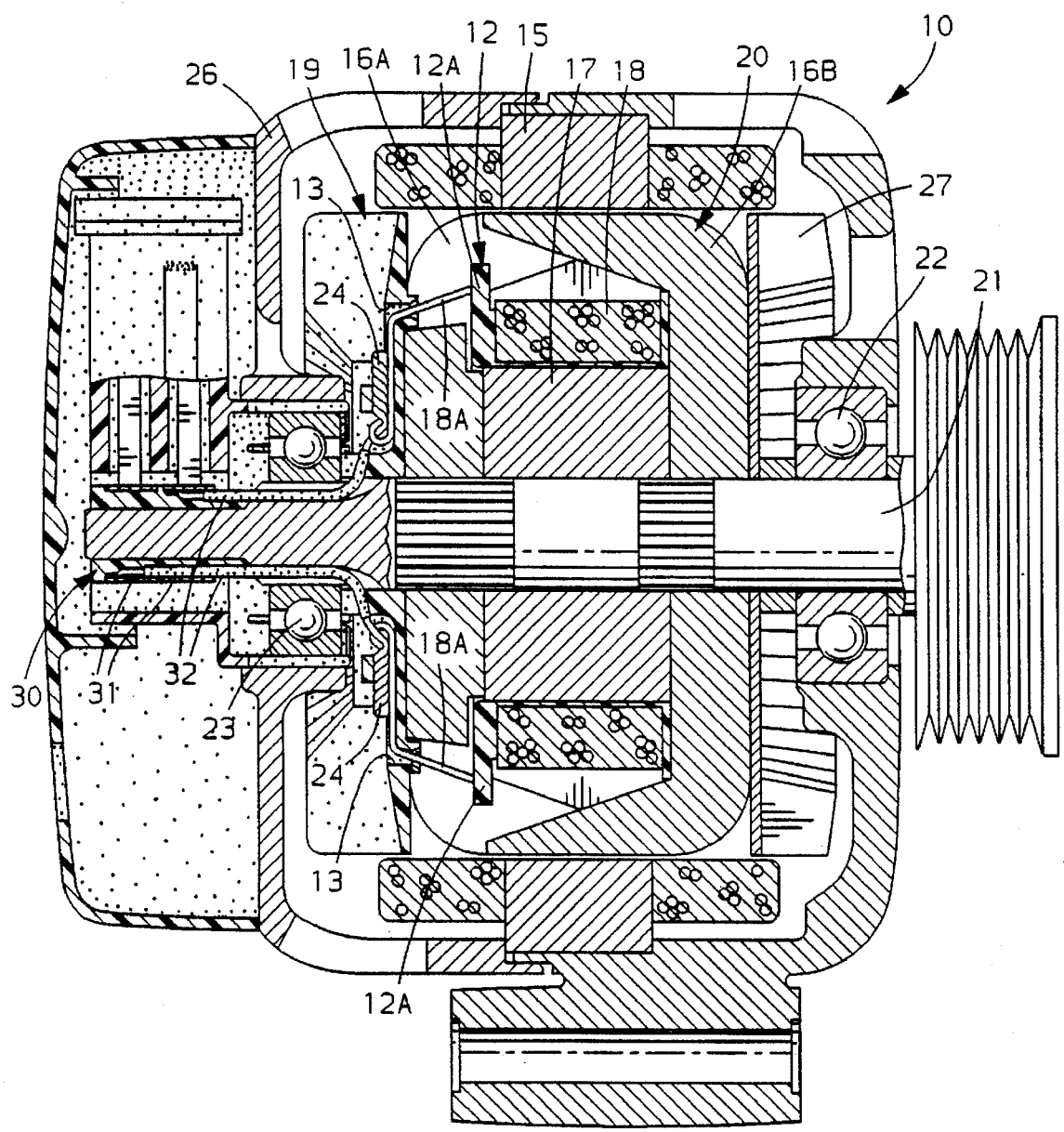
FIG. 1 is a sectional view through a conventional dual internal cooling fan alternator detailing various features improved upon by the present invention.
Figure 2:
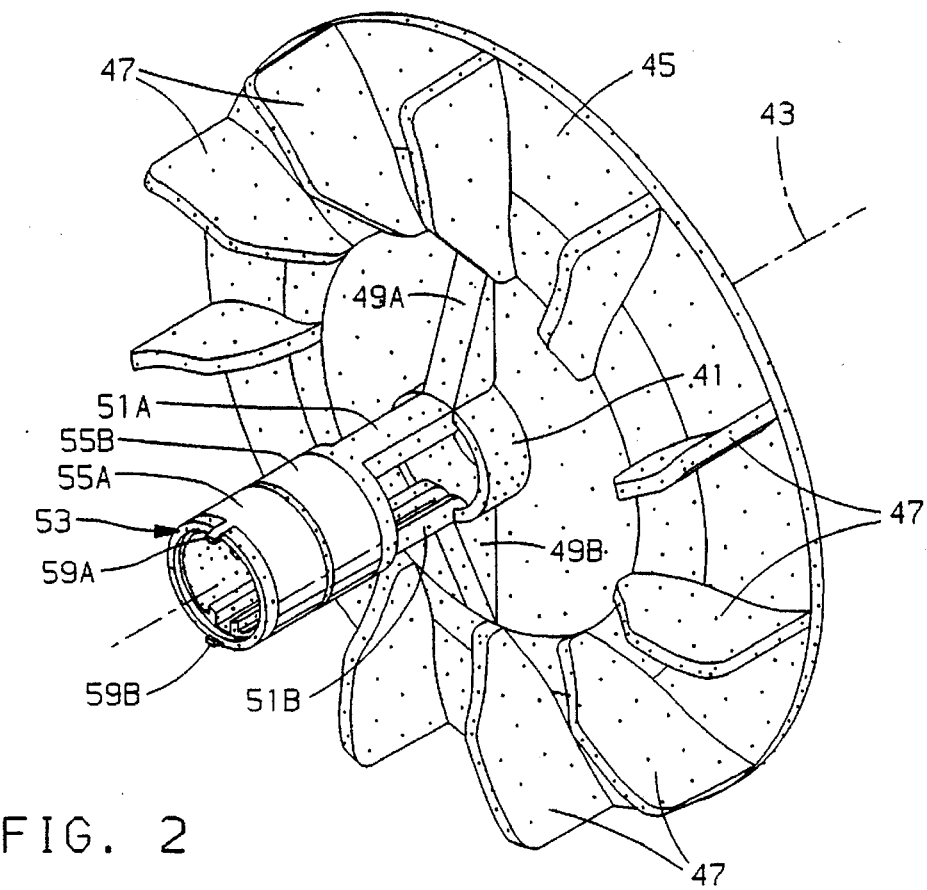
FIG. 2 illustrates a first embodiment of an integrated fan and slip ring assembly in accordance with the present invention.
Figure 3:
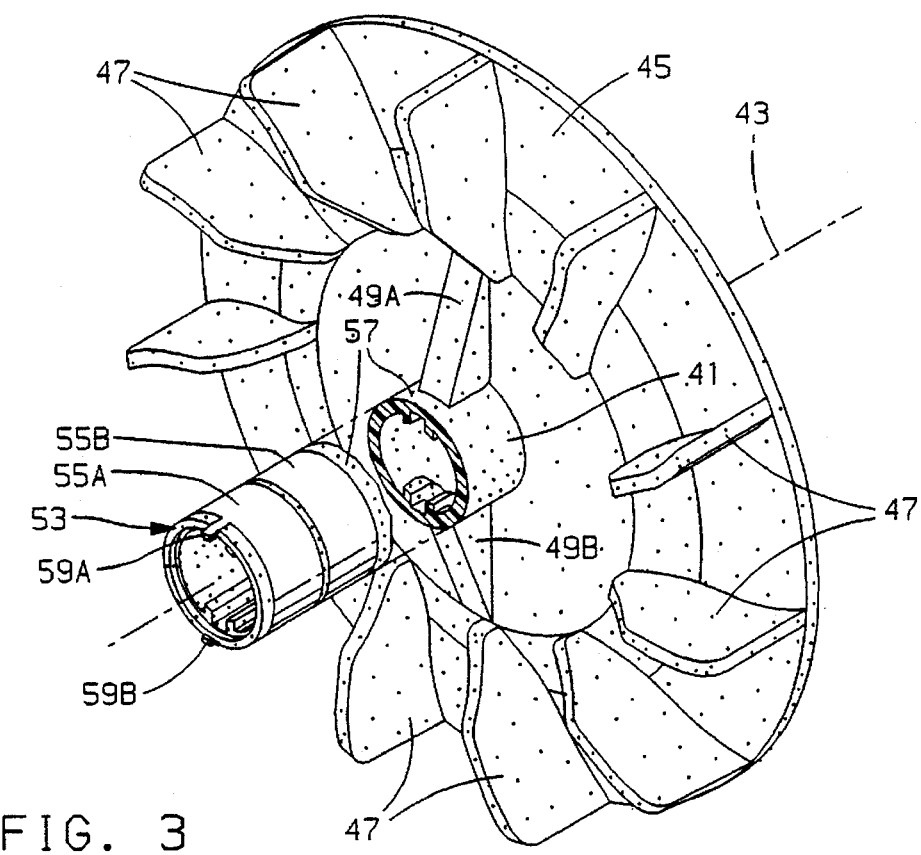
FIG. 3 illustrates a second embodiment of an integrated fan and slip ring assembly in accordance with the present invention.

Referring to FIGS. 2–3, alternative integrated fan and slip rings in accordance with the present invention are illustrated. Each of the various figures may be labeled with like numerals where structure or features are common or shared between the two. Each fan structure comprises a central hub 41 through which the rotor shaft passes and locates the fan assembly substantially concentric therewith. The axis of the rotor shaft is labeled 43 in the figures. Extending radially from the hub is a disk-like carrier portion 45 which provides for attachment of a plurality of fan blades or vanes 47 toward the outer periphery of the carrier 45. The vanes 47 project axially from the surface of the carrier 45 on the side thereof away from the rotor pole member and substantially radially from the axis of the rotor shaft 43. The precise shape and alignment of the vanes 47 is determined by desired airflow characteristics and noise considerations.

Two radially opposite fillets 49A, 49B web between the hub 41 and the surface of the carrier 45 to form on the underside thereof respective channels for coil leads. The channels continue to a portion of the inner surface of the hub and, in the embodiment illustrated in FIG. 2, continue axially as a pair of legs 51A, 51B joining a slip ring assembly 53 at the distal ends thereof. The slip ring assembly 53 is substantially cylindrical at the outer diameter and comprises a pair of circumferentially continuous and axially spaced slip rings 55A, 55B. The inner surface of the assembly 53 includes the continuation of the channels which pass through to the end of the assembly. Preferably, the inner surface of the slip ring assembly is keyed to aid in the proper alignment of the rotor shaft which is complementarily shaped. The embodiments illustrated are keyed by opposing flat surfaces which correspond generally to the channel positions as illustrated. In the embodiment illustrated in FIG. 3, the hub 41 is connected to the slip ring assembly 53 by a circumferentially continuous, substantially tubular portion 57 which continues the channels along the inner surface thereof. FIG. 3 is shown sectioned through a part of the substantially tubular portion 57 connecting the hub 41 and slip ring assembly 53 for clarity. Both embodiments of FIGS. 2 and 3 include a pair of terminals 59A, 59B electrically coupled to respective ones of the slip rings 55A, 55B, which terminals are connected to respective coil leads as later explained and illustrated in FIG. 4. As illustrated in FIGS. 2 and 3, the terminals 59A, 59B are more abbreviated than preferred in order to provide clarity in the end view of the slip ring assembly. The terminals preferably have a portion extending longitudinally from the tip shown exiting the slip ring assembly such that the ends thereof may be crimped about the circumference of the coil leads in a later operation.

Preferably, the integrated fan and slip ring assemblies of FIGS. 2 and 3 are molded from Polyphenylene Sulfide having the desired creep and dimensional characteristics for molding a net dimensioned assembly and also having appropriate tensile and impact characteristics. The slip rings 55A, 55B are manufactured using a conventional cold forming process, each slip ring being continuous about its respective circumference and having an appropriate length terminal. The slip rings 55A, 55B are insert molded into the slip ring assembly, the slip ring terminals 59A, 59B serving as a first locating feature, and the outside diameter of the slip rings serving as second locating feature. A conventional straight pull mold is used to produce the fan and slip ring assembly.

Figure 4:
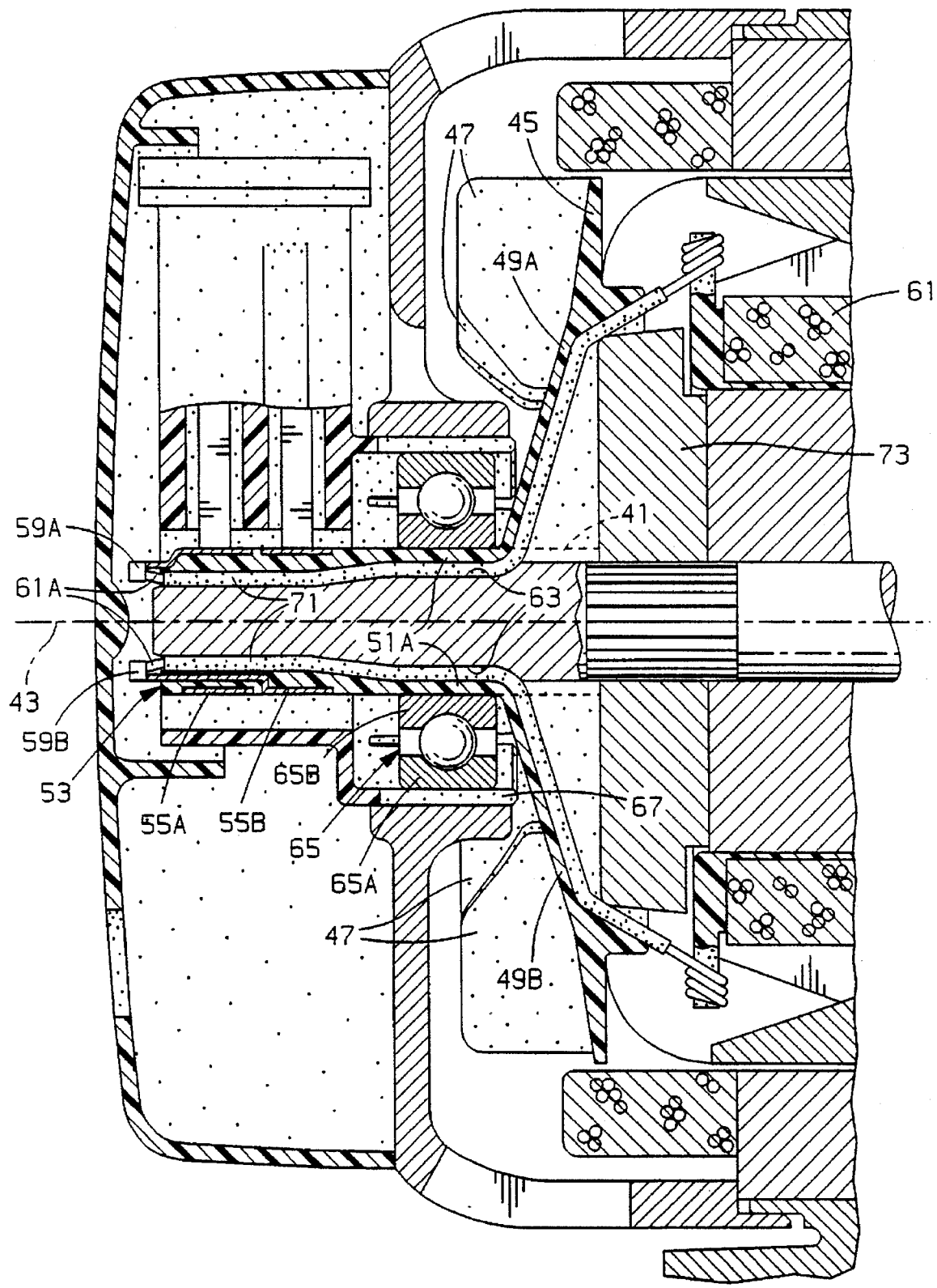
FIG. 4 is a sectional view through a portion of a an alternator incorporating the integrated fan and slip ring assembly as shown in FIG. 2.

With the aid of reference to FIG. 4, which shows in sectional view a fan and slip ring assembly in accordance with the present invention assembled to a rotor shaft, certain features of the invention are abundantly more clear. The fan and slip ring assembly has carrier 45 shown in section the outer circumference and fan blades 47 shown extending in an axial direction therefrom. The inside surface of one side wall of each fillet 49A, 49B is shown, the other side wall (not shown in the sectional view) cooperatively defining the channel for the coil leads 61A. Each coil lead 61A of the field coil 61 is contained between the respective channels formed by the legs 51A, 51B (FIG. 2) or the substantially tubular section 57 (FIG. 3) and the rotor shaft. In the case of the embodiment wherein the hub 41 is connected to the slip ring assembly 53 via a pair of channeled legs 51A, 51B as illustrated in FIG. 2, each leg fits within a respective axial channel 63 in the rotor shaft such that the outer surface of each leg is substantially flush with the outer surface of the rotor shaft. This feature allows for the inner race 65B of the bearing 65 to be press fitted into contact with major surfaces of the rotor shaft to retain the legs within the channels. The bearing in such embodiment has a degree of axial freedom between the outer race 65A and the housing afforded by a plastic cup 67 interposed therebetween, the axial float being desirable for expansion and contraction of the rotor shaft.

In the case of the embodiment wherein the hub 41 is connected to the slip ring assembly 53 via a substantially tubular portion 57 as illustrated in FIG. 3, the channels running the length of the inside of the substantially tubular portion (including the slip ring assembly) are preferably formed by inwardly extending walls. In the case of both constructions, a channel is provided in the rotor shaft to accommodate the extending walls much like the embodiment of FIG. 2. In either particular construction of the embodiment of FIG. 3, the outer diameter of the substantially tubular portion has press fitted thereto the inner race 65B of the bearing. Such an arrangement allows for the outer race 65A of the bearing 65 to be engaged directly with the housing and rigidly secured thereto such as by a rolled crimp at the outer diameter thereof. Axial float would be provided between the inner race 65B and the substantially tubular portion of the fan and slip ring assembly.

Significant alternator assembly advantages are realized with a fan and slip ring assembly as described. After the rotor pole members, core and field coil are assembled to the rotor shaft, the coil leads 61A are extended axially and an insulating sleeve 71 placed over each lead. The leads are placed through the hub opening and exited through the end of the slip ring assembly and located within the channels provided. The fan and slip ring assembly is pressed down on the rotor shaft such that the back surface thereof meets the adjacent pole member 73. The coil leads 61A are held taut and remain secured within the channels provided. If necessary, excess insulating sleeve is stripped where the coil leads exit the end of the slip ring assembly and each coil lead is secured to a respective one of the slip ring terminals 59A, 59B. Preferably, the slip ring terminals 59A, 59B are crimped around the diameter of the coil leads and then welded or soldered. The bearing 65 is then assembled over the end of the fan and slip ring assembly.

We claim:

1. A fan and slip ring assembly for a dynamoelectric machine comprising:

a rotor for said dynamoelectric machine, said rotor comprising a rotatable shaft along a longitudinal axis and a field coil having a pair of coil leads;

a fan having a central aperture through which the shaft and the pair of coil leads pass;

a pair of slip rings longitudinally spaced from said fan and having respective coupling terminals;

connecting means for connecting said fan to said pair of slip rings;

said rotor shaft and said connecting means cooperating to form a pair of closed longitudinal channels, each one of said pair of coil leads passing through a respective one of said pair of closed longitudinal channels and coupled to a respective one of said coupling terminals.

2. A fan and slip ring assembly for a dynamoelectric machine as claimed in claim 1 wherein said connecting means for connecting said fan to said pair of slip rings includes a pair of longitudinally extending legs and said rotor shaft includes a pair of longitudinal channels, said pair of legs and pair of channels being formed such that each one of the pair of longitudinally extending legs fits within a respective one of the pair of longitudinal channels.

3. A fan and slip ring assembly for a dynamoelectric machine as claimed in claim 1 wherein said connecting means for connecting said fan to said pair of slip rings includes a tubular portion having inner and outer surfaces and a first pair of longitudinal channels formed along the inner surface thereof by respective pairs of inwardly extending, longitudinal walls, said rotor shaft includes a second pair of longitudinal channels, said respective pairs of inwardly extending, longitudinal walls and said second longitudinal channels being formed such that each of the respective pairs of inwardly extending, longitudinal walls fits within a respective one of the second pair of longitudinal channels.

* * * * *